United States Patent
Nakao et al.

(10) Patent No.: US 12,236,669 B2
(45) Date of Patent: Feb. 25, 2025

(54) IMAGE PROCESSING SYSTEM, IMAGE PROCESSING METHOD, AND STORAGE MEDIUM

(71) Applicant: FUJITSU LIMITED, Kawasaki (JP)

(72) Inventors: Takanori Nakao, Kawasaki (JP); Tomonori Kubota, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 372 days.

(21) Appl. No.: 17/750,440

(22) Filed: May 23, 2022

(65) Prior Publication Data
US 2022/0277548 A1    Sep. 1, 2022

Related U.S. Application Data

(63) Continuation of application No. PCT/JP2019/050895, filed on Dec. 25, 2019.

(51) Int. Cl.
*G06V 10/771* (2022.01)
*G06V 10/82* (2022.01)
(Continued)

(52) U.S. Cl.
CPC ......... *G06V 10/771* (2022.01); *H04N 19/124* (2014.11); *H04N 19/136* (2014.11); *H04N 19/176* (2014.11); *G06V 10/82* (2022.01)

(58) Field of Classification Search
CPC ...... G06V 10/82; G06V 3/0464; G06V 10/25; G06V 10/771; G06V 10/273; H04N 19/124; H04N 19/176; H04N 19/136; H04N 19/154; H04N 19/17; G06N 3/02; G06T 3/4046; G06T 5/60; G06T 2207/20084

See application file for complete search history.

(56) References Cited

U.S. PATENT DOCUMENTS

2010/0119157 A1    5/2010   Kameyama
2018/0012098 A1*   1/2018   Mizuno ............... H04N 19/63
(Continued)

FOREIGN PATENT DOCUMENTS

JP   2001-028692 A    1/2001
JP   2001-333281 A    11/2001
(Continued)

OTHER PUBLICATIONS

Japanese Office Action mailed Jun. 6, 2023 for corresponding Japanese Patent Application No. 2021-566650, with English Translation, 15 pages. *Please note NPL "Choi, Hyomin et al., High Efficiency Compression for Object Detection, 2018 . . . " and JP-2013-187769-A cited herewith, were previously cited in an IDS filed on May 23, 2022.*
(Continued)

*Primary Examiner* — Bobbak Safaipour
*Assistant Examiner* — Michael Kim Maiden
(74) *Attorney, Agent, or Firm* — Fujitsu Intellectual Property Center

(57) ABSTRACT

An image processing system includes one or more memories; and one or more processors coupled to the one or more memories and the one or more processors configured to acquire a degree of influence of each region of image data on a recognition result when recognition processing is performed for the image data, and reduce data size of the image data based on the degree of influence.

6 Claims, 14 Drawing Sheets

(51) Int. Cl.
  *H04N 19/124* (2014.01)
  *H04N 19/136* (2014.01)
  *H04N 19/176* (2014.01)

(56) References Cited

U.S. PATENT DOCUMENTS

| | | | | |
|---|---|---|---|---|
| 2018/0373964 | A1* | 12/2018 | Kondo | G06T 5/50 |
| 2019/0045207 | A1* | 2/2019 | Chen | G06N 3/045 |
| 2019/0268605 | A1* | 8/2019 | Yamasaki | H04N 19/124 |
| 2020/0145662 | A1* | 5/2020 | Park | G06V 10/764 |

FOREIGN PATENT DOCUMENTS

| | | |
|---|---|---|
| JP | 2009-049976 A | 3/2009 |
| JP | 2010-220042 A | 9/2010 |
| JP | 2013-187769 A | 9/2013 |

OTHER PUBLICATIONS

International Search Report and Written Opinion of the International Searching Authority (Form PCT/ISA/210, 220, and 237), mailed in connection with PCT/JP2019/050895 and mailed Mar. 17, 2020 (Total 19 pages).

Hyomin Choi et al., "High Efficiency Compression for Object Detection", 2018 IEEE International Conference on Acoustics, Speech and Signal Processing (ICASSP 2018), DOI: 10.1109/icassp.2018.8462653, pp. 1792-1796, Sep. 13, 2018 (Total 6 pages) [online] https://ieeexplore.ieee.org/document/8462653 (Cited in ISR).

Satoshi Suzuki et al., "Image Pre-Transformation for Recognition-Aware Image Compression", 2019 IEEE International Conference on Image Processing (ICIP 2019), DOI: 10.1109/ICIP.2019.8803275, pp. 2686-2690, Aug. 26, 2019 (Total 5 pages) [online] https://ieeexplore.ieee.org/document/8803275 (Cited in ISR).

Leonardo Galteri et al., "Video Compression for Object Detection Algorithms", 2018 24th International Conference on Pattern Recognition (ICPR), DOI: 10.1109/ICPR.2018.8546064, pp. 3007-3012, Nov. 29, 2018 (Total 6 pages) [online] https://ieeexplore.ieee.org/document/8546064 (Cited in ISR).

* cited by examiner

IMAGE PROCESSING SYSTEM, IMAGE PROCESSING METHOD, AND STORAGE MEDIUM

CROSS-REFERENCE TO RELATED APPLICATION

This application is a continuation application of International Application PCT/JP2019/050895 filed on Dec. 25, 2019 and designated the U.S., the entire contents of which are incorporated herein by reference.

FIELD

The present invention relates to an image processing system, an image processing method, and a storage medium.

BACKGROUND

Generally, when image data is recorded or transmitted, recording cost and transmission cost are reduced by reducing a data size by compression processing.

Meanwhile, in recent years, there have been an increasing number of cases in which image data is recorded or transmitted for the purpose of use for image recognition processing by artificial intelligence (AI).

Patent Document 1: Japanese Laid-open Patent Publication No. 2009-49976; Patent Document 2: Japanese Laid-open Patent Publication No. 2001-28692; Patent Document 3: Japanese Laid-open Patent Publication No. 2001-333281.

SUMMARY

According to an aspect of the embodiments, an image processing system includes one or more memories; and one or more processors coupled to the one or more memories and the one or more processors configured to acquire a degree of influence of each region of image data on a recognition result when recognition processing is performed for the image data, and reduce data size of the image data based on the degree of influence.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
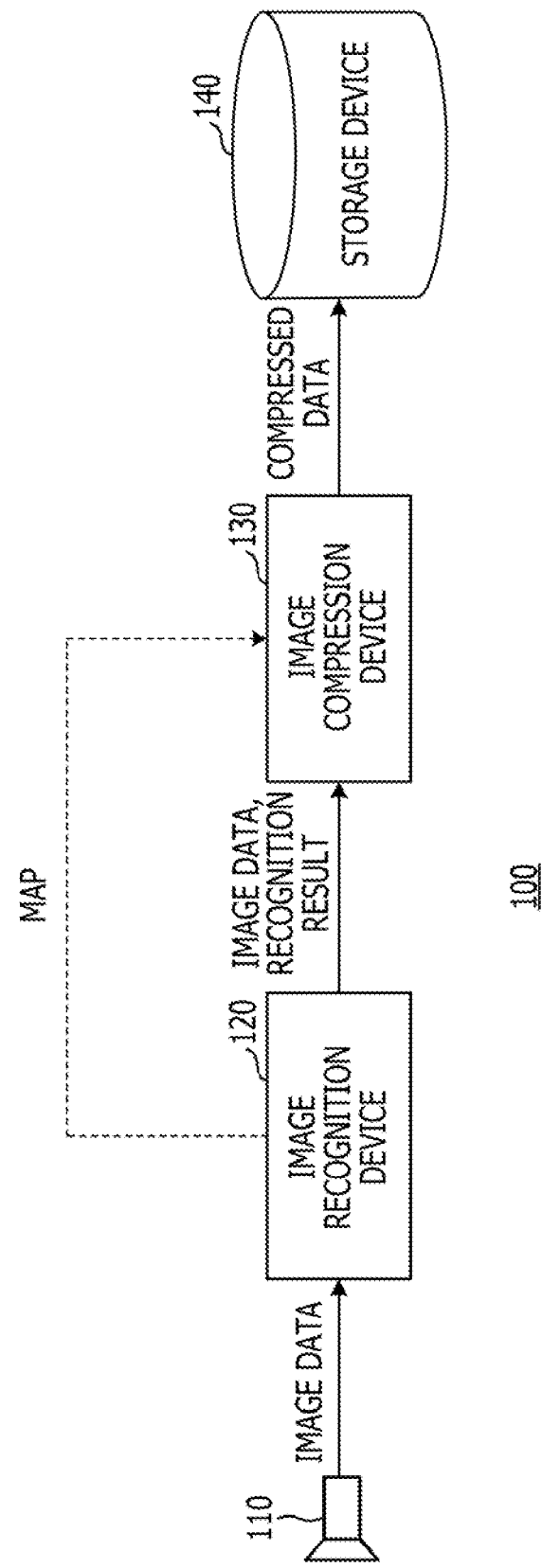
FIG. 1 is a first diagram illustrating an example of a system configuration of an image processing system.

The existing compression processing is not performed on the basis of a feature part that the AI has paid attention to at the time of inference (the processing is performed on the basis of a shape and a property that can be grasped by a human concept). That is, the processing is not performed by analyzing the feature part that the AI has really paid attention to at the time of inference (the feature part that cannot always be demarcated by the human concept).

Therefore, in the existing compression processing, the data size may not be able to be sufficiently reduced. In other words, in the existing compression processing, image quality of an important region is deteriorated in the image recognition processing, and sufficient recognition accuracy may not be obtained when the data is decoded.

In one aspect, an object is to implement data size reduction processing suitable for image recognition processing.

Data size reduction processing suitable for image recognition processing may be implemented.

Hereinafter, each embodiment will be described with reference to the attached drawings. Note that, in the description and the drawings, components having substantially the same functional configuration are denoted by the same reference numerals, and redundant description is omitted.

First Embodiment

System Configuration of Image Processing System

First, a system configuration of an image processing system according to a first embodiment will be described. FIG. 1 is a first diagram illustrating an example of a system configuration of the image processing system. As illustrated in FIG. 1, an image processing system 100 includes an imaging device 110, an image recognition device 120, an image compression device 130, and a storage device 140.

The imaging device 110 captures an image at a predetermined frame period, and transmits image data to the image recognition device 120.

The image recognition device 120 perform recognition processing in units of frames for the image data transmitted from the imaging device 110, and transmits a recognition result to the image compression device 130 in association with the image data in units of frames.

Furthermore, when performing the recognition processing for the image data, the image recognition device 120 generates a map illustrating the degree of influence of each region of the image data on the recognition result in units of frames and transmits the map to the image compression device 130.

The image compression device 130 performs compression processing in units of frames for the image data transmitted from the image recognition device 120 to generate compressed data. When performing the compression processing for the image data, the image compression device 130 refers to the map transmitted from the image recognition device 120 and performs the compression processing for the image data at a compression level according to the map. Furthermore, the image compression device 130 transmits the generated compressed data to the storage device 140.

The storage device 140 stores the compressed data transmitted from the image compression device 130.

Hardware Configuration of Image Recognition Device and Image Compression Device Next, a hardware configuration of the image recognition device 120 and the image compression device 130 will be described. Note that since the image recognition device 120 and the image compression device 130 have a similar hardware configuration, here, both the devices will be collectively described with reference to FIG. 2.

Figure 2:
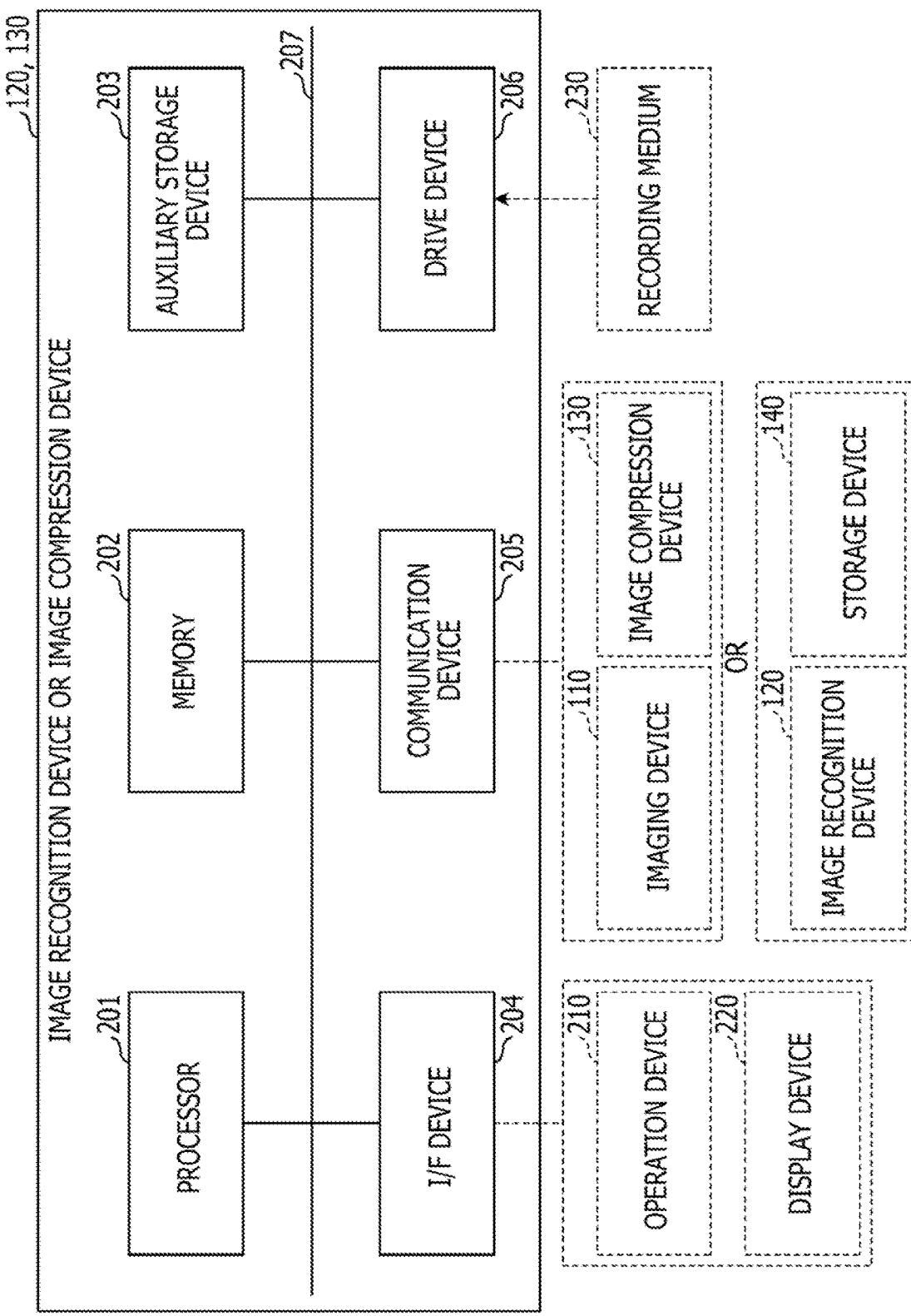
FIG. 2 is a diagram illustrating an example of a hardware configuration of an image recognition device or an image compression device.

FIG. 2 is a diagram illustrating an example of a hardware configuration of an image recognition device or an image compression device. The image recognition device 120 or the image compression device 130 includes a processor 201, a memory 202, an auxiliary storage device 203, an interface (I/F) device 204, a communication device 205, and a drive device 206. Note that each hardware of the image recognition device 120 or the image compression device 130 is connected to each other via a bus 207.

The processor 201 includes various arithmetic devices such as a central processing unit (CPU) and a graphics processing unit (GPU). The processor 201 reads and executes various programs (for example, an image recognition program or an image compression program to be described below and the like) on the memory 202.

The memory 202 includes a main storage device such as a read only memory (ROM) or a random access memory (RAM). The processor 201 and the memory 202 form a so-called computer. The processor 201 executes various programs read on the memory 202 to cause a computer to implement various functions (details of the various functions will be described below).

The auxiliary storage device 203 stores various programs and various data used when the various programs are executed by the processor 201.

The I/F device 204 is a connection device that connects an operation device 210 and a display device 220, which are examples of external devices, with the image recognition device 120 or the image compression device 130. The I/F device 204 receives an operation on the image recognition device 120 or the image compression device 130 via the operation device 210. Furthermore, the I/F device 204 outputs a result of processing by the image recognition device 120 or the image compression device 130, and displays the result via the display device 220.

The communication device 205 is a communication device for communicating with another device. In the case of the image recognition device 120, the image recognition device 120 communicates with the imaging device 110 and the image compression device 130 via the communication device 205. Furthermore, in the case of the image compression device 130, the image compression device 130 communicates with the image recognition device 120 and the storage device 140 via the communication device 205.

The drive device 206 is a device for setting a recording medium 230. The recording medium 230 referred to here includes a medium for optically, electrically, or magnetically recording information, such as a compact disk read only memory (CD-ROM), a flexible disk, or a magneto-optical disk. Alternatively, the recording medium 230 may include a semiconductor memory or the like that electrically records information, such as a ROM or a flash memory.

Note that various programs to be installed in the auxiliary storage device 203 are installed, for example, by setting the distributed recording medium 230 in the drive device 206 and reading the various programs recorded in the recording medium 230 by the drive device 206. Alternatively, the various programs to be installed in the auxiliary storage device 203 may be installed by being downloaded from a network via the communication device 205.

Functional Configuration of Image Recognition Device

Figure 3:
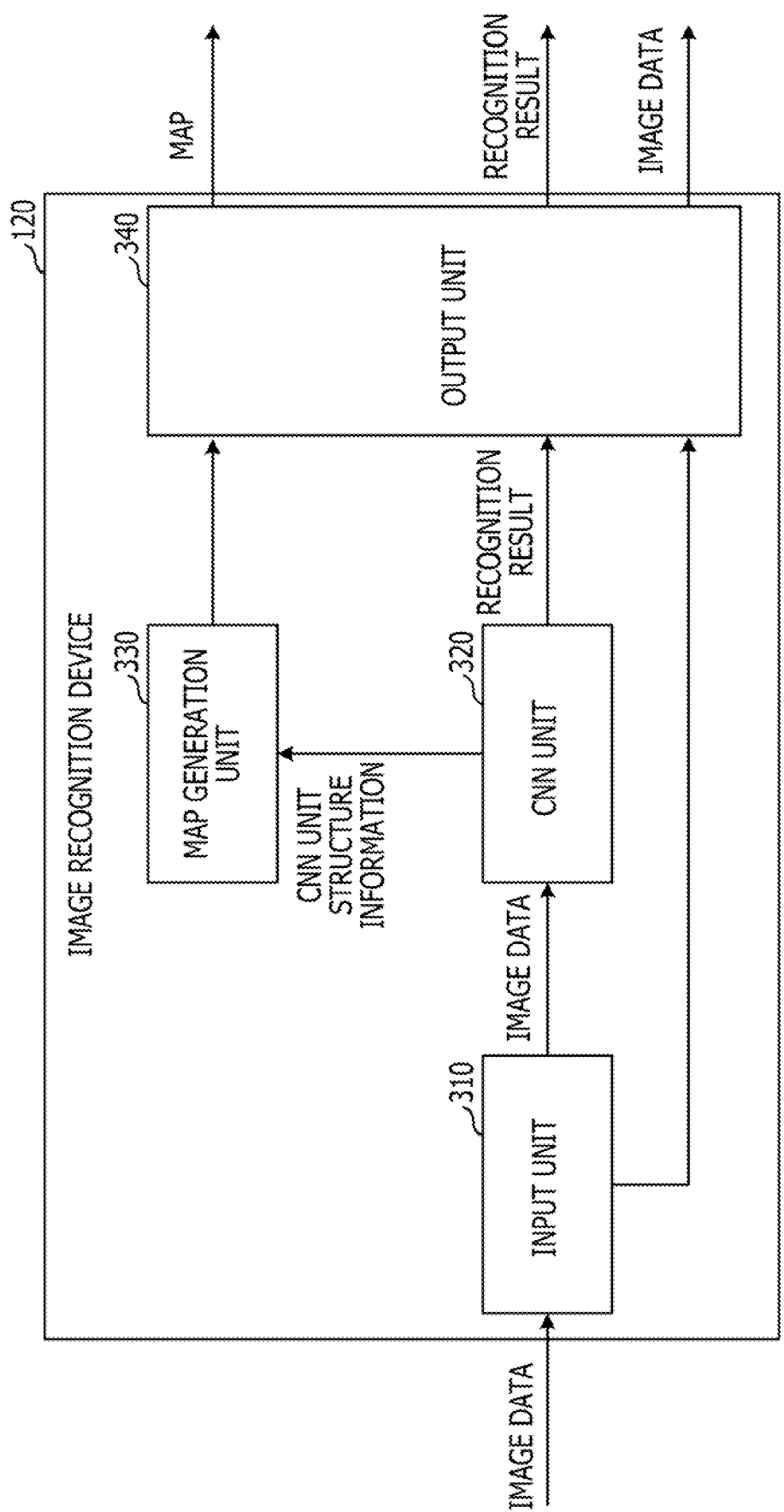
FIG. 3 is a diagram illustrating an example of a functional configuration of the image recognition device.

Next, a functional configuration of the image recognition device 120 will be described. FIG. 3 is a diagram illustrating an example of a functional configuration of the image recognition device. As described above, an image recognition program is installed in the image recognition device 120, and when the program is executed, the image recognition device 120 functions as an input unit 310, a CNN unit 320, a map generation unit 330, and an output unit 340.

The input unit 310 acquires the image data transmitted from the imaging device 110 in units of frames and notifies the CNN unit 320 and the output unit 340.

The CNN unit 320 performs the recognition processing in units of frames for the acquired image data using a convolutional neural network (CNN).

Furthermore, the CNN unit 320 notifies a recognition result to the output unit 340.

Furthermore, the CNN unit 320 notifies the map generation unit 330 of a CNN unit structure information acquired when having performed the recognition processing for the image data.

The map generation unit 330 is an example of a calculation unit. The map generation unit 330 analyzes the CNN unit structure information acquired when the CNN unit 320 performs the recognition processing in units of frames for the image data, generates a map illustrating the degree of influence of each region of the image data on the recognition result, and notifies the map to the output unit 340.

The output unit 340 transmits the image data notified by the input unit 310, the recognition result notified by the CNN unit 320, and the map notified by the map generation unit 330 to the image compression device 130 in units of frames in association with one another.

First Specific Example of Processing by Image Recognition Device

Figure 4:
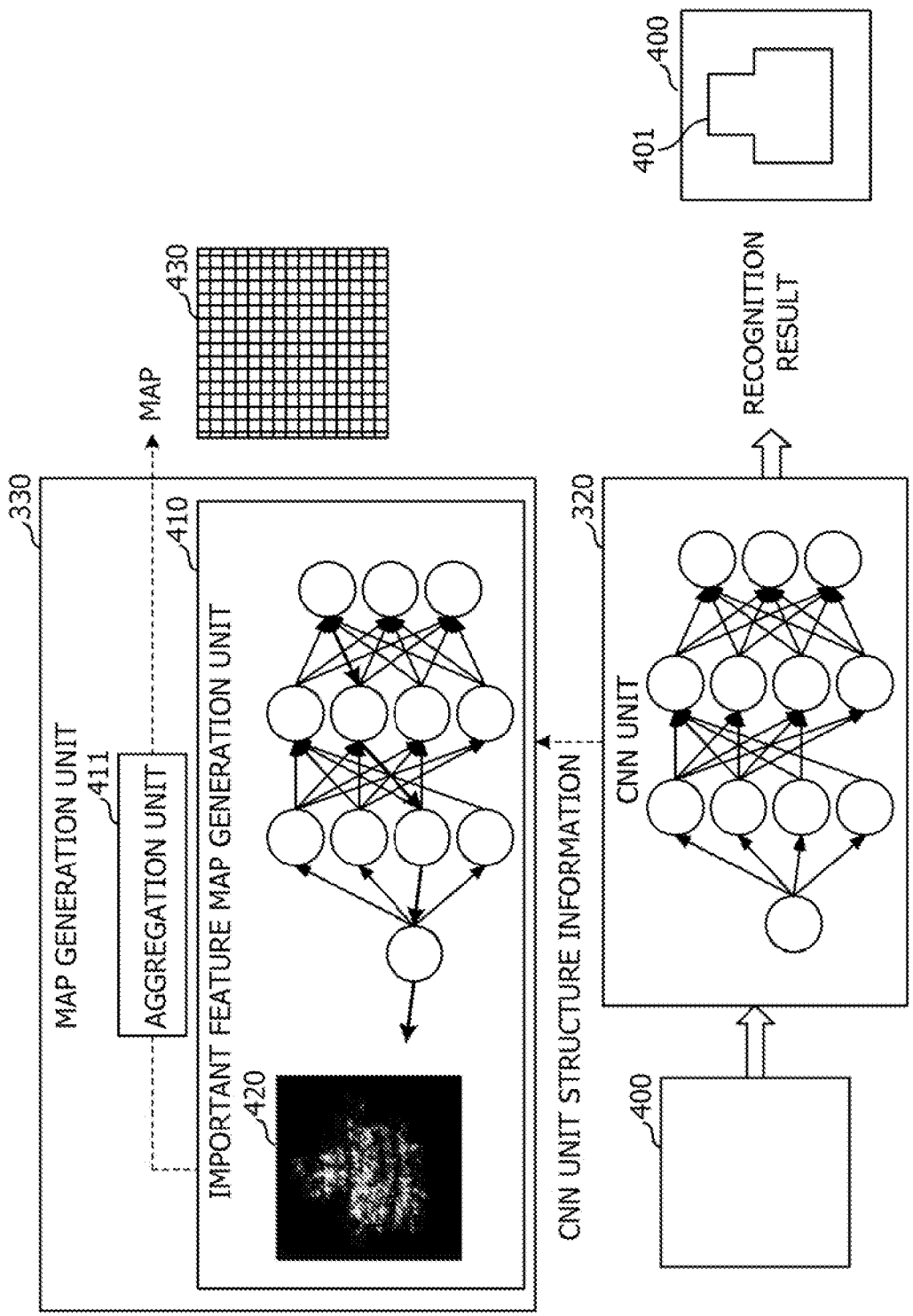
FIG. 4 is a diagram illustrating a first specific example of processing by the image recognition device.

Next, a first specific example of processing by the image recognition device 120 will be described. FIG. 4 is a diagram illustrating a first specific example of processing by the image recognition device.

As illustrated in FIG. 4, when image data 400 of a predetermined frame among a plurality of frames included in the image data transmitted from the imaging device 110 is input to the CNN unit 320, the image data 400 undergoes forward propagation processing by the CNN unit 320.

Thereby, the recognition result of a target object 401 included in the image data 400 is output from an output layer of the CNN unit 320. Note that, here, a label output from the CNN unit 320 is assumed to be used as a correct answer label.

Furthermore, as illustrated in FIG. 4, the map generation unit 330 includes, for example, an important feature map generation unit 410 and an aggregation unit 411. The important feature map generation unit 410 generates an "important feature map" on the basis of the CNN unit structure information by using a back propagation (BP) method, a guided back propagation (GBP) method, a selective BP method, or the like. The important feature map is a map that visualizes a feature part (the degree of influence of each region of the image data on the recognition result) that reacts during the recognition processing.

Note that the BP method is a method of calculating an error of each label from a classification probability obtained by performing the recognition processing for the image data for which the correct answer label is output as the recognition result, and imaging the magnitude of a gradient obtained by back propagation up to an input layer, thereby visualizing the feature part. Furthermore, the GBP method is a method of imaging only a positive value of gradient information as the feature part, thereby visualizing the feature part.

Moreover, the selective BP method is a method of performing processing using the BP method or the GBP method after maximizing only the error of the correct answer label. In the case of the selective BP method, the feature part to be visualized is the feature part that affects only a score of the correct answer label.

The example of FIG. 4 illustrates a state in which an important feature map 420 has been generated by the selective BP method. The important feature map generation unit 410 notifies the generated important feature map 420 to the aggregation unit 411.

Note that, in FIG. 4, the case where the important feature map generation unit 410 is arranged in the map generation unit 330, and the important feature map 420 is generated has been described, but the map generated by the map generation unit 330 is not limited to the important feature map 420. For example, a heatmap may be generated using a Grad-CAM method.

The aggregation unit 411 aggregates the degree of influence of each region of the image data on the recognition result in units of predetermined processing blocks using the important feature map (or heatmap), thereby generating a map 430 indicating the degree of influence of each processing block on the recognition result. Note that it is assumed that the processing block refers to, for example, a processing block used for compression processing in the image compression device 130.

As described above, in the first specific example, when the CNN unit 320 outputs the recognition result, the map illustrating the important processing blocks in the image data is generated on the basis of the recognition processing by the CNN unit 320 (not on the basis of a shape or a property that can be grasped by the human concept).

Second Specific Example of Processing by Image Recognition Device

Figure 5:
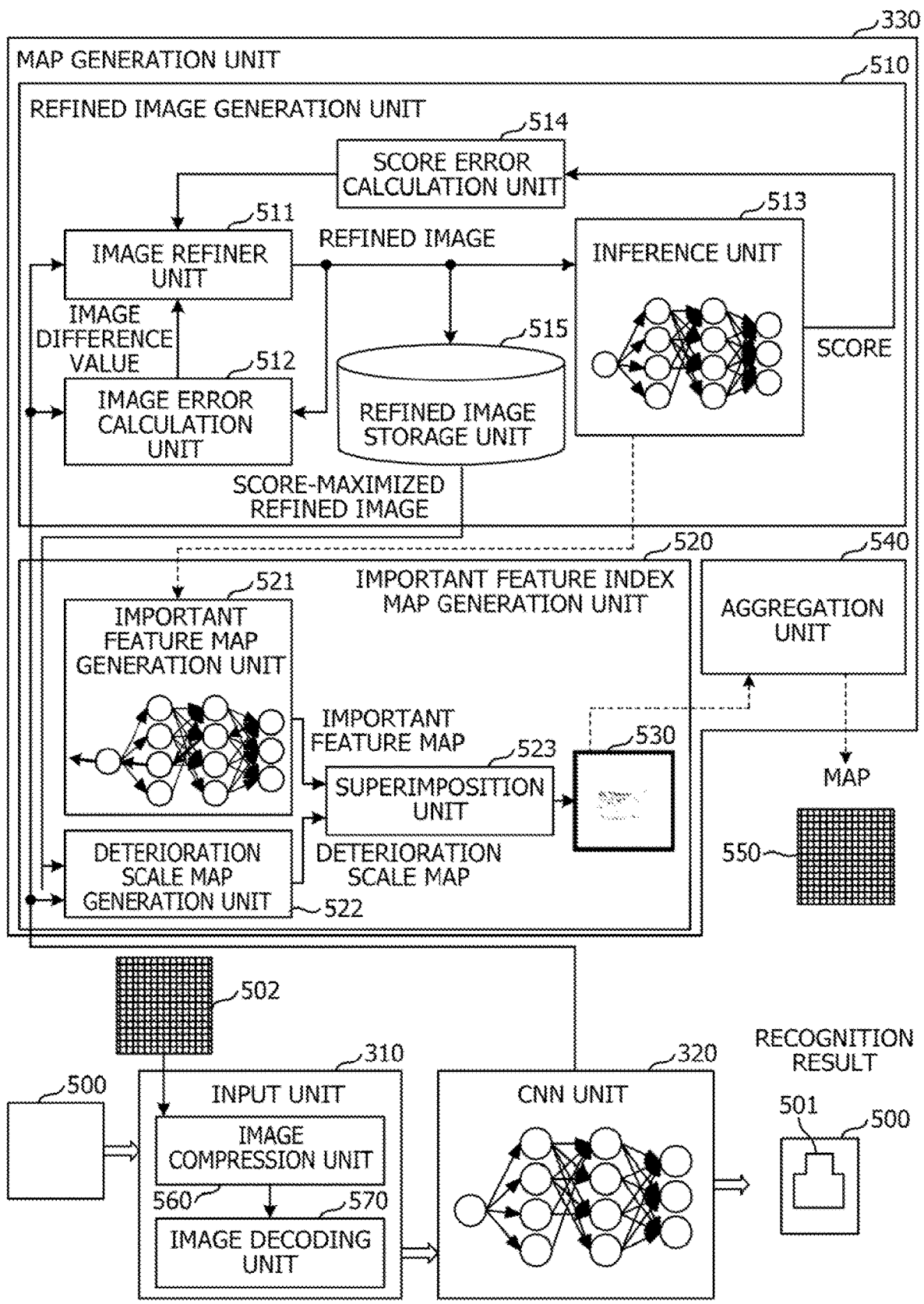
FIG. 5 is a diagram illustrating a second specific example of the processing by the image recognition device.

Next, a second specific example of the processing by the image recognition device 120 will be described. FIG. 5 is a diagram illustrating a second specific example of the processing by the image recognition device.

As illustrated in FIG. 5, when image data 500 of a predetermined frame among a plurality of frames included in the image data transmitted from the imaging device 110 is input to the input unit 310, the image data 500 undergoes compression processing by an image compression unit 560 using a predetermined quantization value 502.

The image data 500 that has undergone compression processing undergoes decoding processing by an image decoding unit 570, then input to the CNN unit 320, and undergoes the forward propagation processing by the CNN unit 320. Thereby, the recognition result of a target object 501 included in the image data 500 is output from the output layer of the CNN unit 320. Note that, here, it is assumed that a low score is output from the output layer of the CNN unit 320 as the recognition result of the correct answer label.

In this case, the map generation unit 330 changes the image data 500 so that a high score is output as the recognition result of the correct answer label, and generates a map using the image data that maximizes the score of the recognition result.

Specifically, as illustrated in FIG. 5, the map generation unit 330 includes, for example, a refined image generation unit 510, an important feature index map generation unit 520, and an aggregation unit 540.

Moreover, the refined image generation unit 510 includes an image refiner unit 511, an image error calculation unit 512, an inference unit 513, and a score error calculation unit 514.

The image refiner unit 511 generates refined image data from the image data 500, using CNN as an image data generation model, for example.

Note that the image refiner unit 511 changes the image data 500 so that the score of the correct answer label becomes the maximum when the inference unit 513 performs recognition processing using the generated refined image data. Furthermore, the image refiner unit 511 generates the refined image data so that an amount of change from the image data 500 (a difference between the refined image data and the image data 500) becomes small, for example. Thereby, according to the image refiner unit 511, image data (refined image data) that is visually close to the image data (image data 500) before the change can be obtained.

Specifically, the image refiner unit 511 performs CNN learning so as to minimize
- an error (score error) between the score when the recognition processing is performed using the generated refined image data and the score that maximizes the score of the correct answer label, and
- an image difference value, which is the difference between the generated refined image data and the image data 500.

The image error calculation unit 512 calculates the difference between the image data 500 and the refined image data output from the image refiner unit 511 during CNN learning, and inputs the image difference value to the image refiner unit 511. The image error calculation unit 512 calculates the image difference value by performing, for example, a difference (L1 difference) or structural similarity (SSIM) calculation for each pixel, and inputs the image difference value to the image refiner unit 511.

The inference unit 513 has the trained CNN that performs recognition processing using the refined image data generated by the image refiner unit 511 as an input, and outputs the score of the label of the recognition result. Note that the score output by the inference unit 513 is notified to the score error calculation unit 514.

The score error calculation unit 514 calculates the error between the score notified by the inference unit 513 and the score that maximizes the score of the correct answer label, and notifies the score error to the image refiner unit 511. The score error notified by the score error calculation unit 514 is used for CNN learning in the image refiner unit 511.

Note that the refined image output from the image refiner unit 511 during CNN learning that the image refiner unit 511 has is stored in a refined image storage unit 515. CNN learning that the image refiner unit 511 has is performed by a predetermined number of learnings (for example, maximum number of learnings=N times), or until the score on the correct answer label exceeds a predetermined threshold value, or until the score of the correct answer label exceeds the predetermined threshold value and the image difference value becomes smaller than the predetermined threshold value.

Hereinafter, the refined image data when the score of the correct answer label output by the inference unit 513 is maximized is referred to as "score-maximized refined image data".

Next, details of the important feature index map generation unit 520 will be described. As illustrated in FIG. 5, the important feature index map generation unit 520 includes an important feature map generation unit 521, a deterioration scale map generation unit 522, and a superimposition unit 523.

The important feature map generation unit 521 acquires, from the inference unit 513, the inference unit structure information when the recognition processing is performed using the score-maximized refined image data as an input. Furthermore, the important feature map generation unit 521 generates the important feature map on the basis of the inference unit structure information by using the BP method, the GBP method, or the selective BP method.

The deterioration scale map generation unit 522 generates a "deterioration scale map" on the basis of the image data 500 and the score-maximized refined image data. The deterioration scale map is a map illustrating changed parts and the degree of change of each changed part when the image data 500 is changed to the score-maximized refined image data.

The superimposition unit 523 generates an important feature index map 530 by superimposing the important feature map generated by the important feature map generation unit 521 and the deterioration scale map generated by the deterioration scale map generation unit 522. The important feature index map 530 is a map that visualizes the degree of influence of each region of the image data on the recognition result.

The aggregation unit 540 generates a map 550 indicating the degree of influence of each processing block on the recognition result by aggregating the degree of influence of each region of the image data on the recognition result in units of predetermined processing blocks using the important feature index map 530. Note that, as described above, the processing block is assumed to be refer to, for example, a processing block used for the compression processing in the image compression device 130.

As described above, in the second specific example, when the CNN unit 320 outputs the recognition result, the map illustrating the important processing blocks in the image data is generated on the basis of the recognition processing by the CNN unit 320 (not on the basis of a shape or a property that can be grasped by the human concept). Moreover, in the second specific example, by applying the deterioration scale map illustrating a deteriorated part where the CNN unit 320 deteriorates the recognition result, and the important feature map representing the feature part important in the image data when the CNN unit 320 outputs the recognition result, the map 550 with higher accuracy than a case of using only one of the deterioration scale map or the important feature map is generated.

Note that the above description has been given on the premise that the map 550 is generated once for the image data 500. However, the number of times of generating the map 550 is not limited to once. For example, the map 550 may be generated by the image compression device 130 determining the quantization value 502 on the basis of the generated map 550, and performing the same processing again using the determined quantization value 502. Furthermore, these processes may be repeated a plurality of times. Thereby, the accuracy of the generated map 550 can be improved.

Functional Configuration of Image Compression Device

Figure 6:
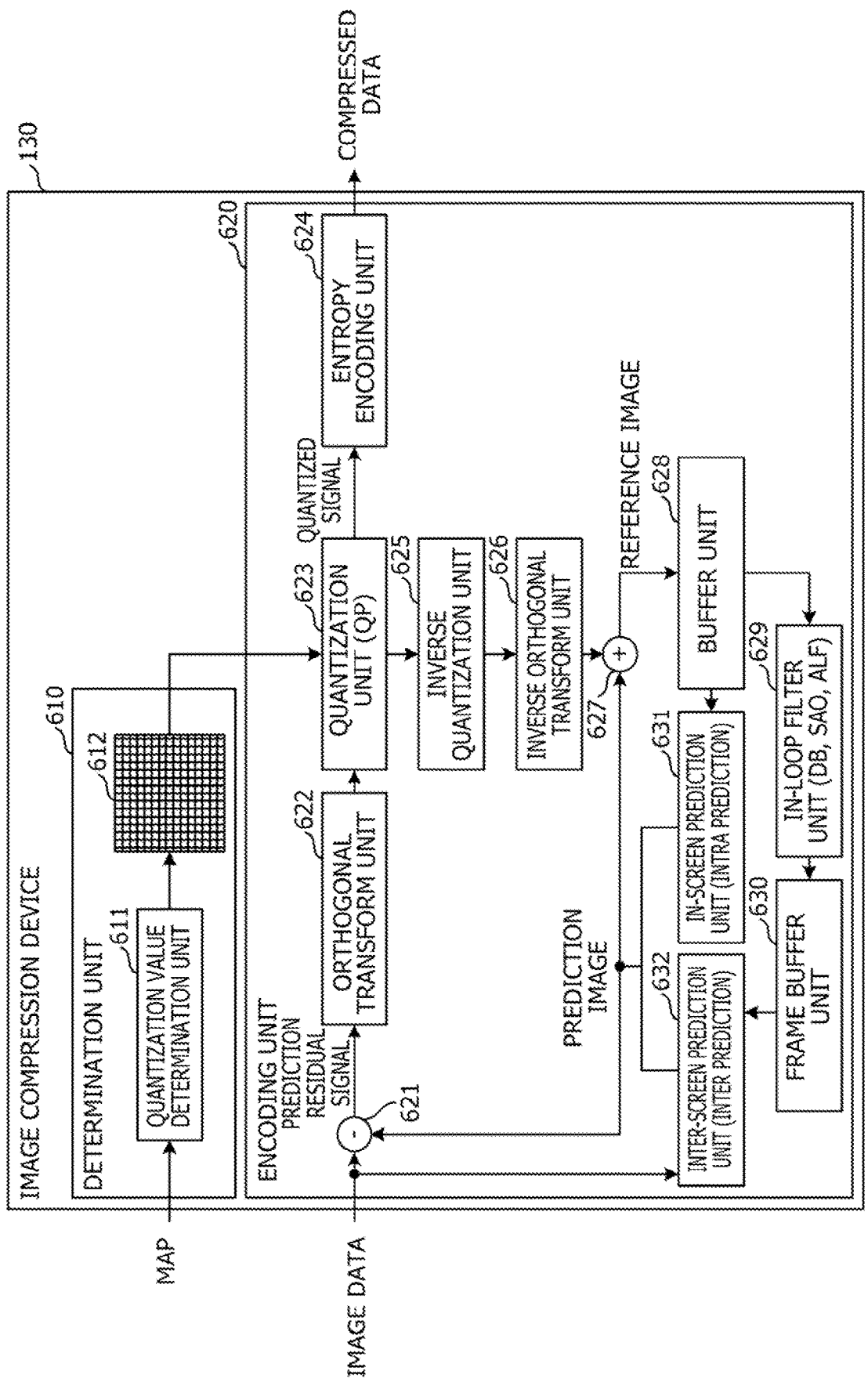
FIG. 6 is a first diagram illustrating an example of a functional configuration of the image compression device.

Next, a functional configuration of the image compression device 130 will be described. FIG. 6 is a first diagram illustrating an example of a functional configuration of the image compression device. As described above, an image compression program is installed in the image compression device 130, and when the program is executed, the image compression device 130 functions as a determination unit 610 and an encoding unit 620.

The determination unit 610 is an example of an execution unit. As illustrated in FIG. 6, the determination unit 610 further includes a quantization value determination unit 611.

The quantization value determination unit 611 determines a quantization value 612 of each processing block on the basis of the map (for example, the map 430 or 550) transmitted from the image recognition device 120, and notifies the quantization value to the encoding unit 620.

For example, the quantization value determination unit 611 determines the quantization value 612 according to the degree of influence on the recognition result on the basis of the map 430. Furthermore, for example, the quantization value determination unit 611 determines the quantization value 612 according to the degree of influence on the recognition result or corrects the quantization value 502 on the basis of the map 530. Note that, in a case where the recognition accuracy is deteriorated by the compression processing with the quantization value 502, the map 530 illustrates the deteriorated part that causes the deterioration of the recognition accuracy. Therefore, the recognition accuracy is improved by correcting the quantization value 502 on the basis of the degree of influence on the recognition result illustrated in the map 530.

In this way, the quantization value determination unit 611 executes the processing of determining the quantization value (processing for reducing the data size of the image data) on the basis of the degree of influence on the recognition result for each processing block.

The encoding unit 620 is an example of a compression unit. The encoding unit 620 includes a difference unit 621, an orthogonal transform unit 622, a quantization unit 623, an entropy encoding unit 624, an inverse quantization unit 625, and an inverse orthogonal transform unit 626. Furthermore, the encoding unit 620 includes an addition unit 627, a buffer unit 628, an in-loop filter unit 629, a frame buffer unit 630, an in-screen prediction unit 631, and an inter-screen prediction unit 632.

The difference unit 621 calculates a difference between the image data (for example, the image data 400 or 500) and prediction image data, and outputs a prediction residual signal.

The orthogonal transform unit 622 executes orthogonal transform processing for the prediction residual signal output by the difference unit 621.

The quantization unit 623 quantizes the prediction residual signal that has undergone the orthogonal transform processing to generate a quantized signal. The quantization unit 623 generates the quantized signal using the quantization value 612 determined for each processing block by the determination unit 610.

The entropy encoding unit 624 generates compressed data by performing entropy encoding processing for the quantized signal.

The inverse quantization unit 625 inversely quantizes the quantized signal. The inverse orthogonal transform unit 626 executes inverse orthogonal transform processing for the inversely quantized signal.

The addition unit 627 generates reference image data by adding the signal output from the inverse orthogonal transform unit 626 and a prediction image. The buffer unit 628 stores the reference image data generated by the addition unit 627.

The in-loop filter unit 629 performs filter processing for the reference image data stored in the buffer unit 628. The in-loop filter unit 629 includes:

a deblocking filter (DB);
a sample adaptive offset filter (SAO); and
an adaptive loop filter (ALF).

The frame buffer unit 630 stores the reference image data for which the filter processing has been performed by the in-loop filter unit 629 in units of frames.

The in-screen prediction unit 631 performs in-screen prediction on the basis of the reference image data and generates prediction image data. The inter-screen prediction unit 632 performs motion compensation between frames using the input image data (for example, image data 400 or 500) and the reference image data and generates the prediction image data.

Note that the prediction image data generated by the in-screen prediction unit 631 or the inter-screen prediction unit 632 is output to the difference unit 621 and the addition unit 627.

Note that, in the above description, it is assumed that the encoding unit 620 performs compression processing using an existing moving image encoding method such as MPEG-2, MPEG-4, H.264, or HEVC. However, the compression processing by the encoding unit 620 is not limited to these moving image encoding methods, and may be performed using any encoding method that controls a compression rate by quantization.

Specific Example of Processing of Image Compression Device

Figure 7:
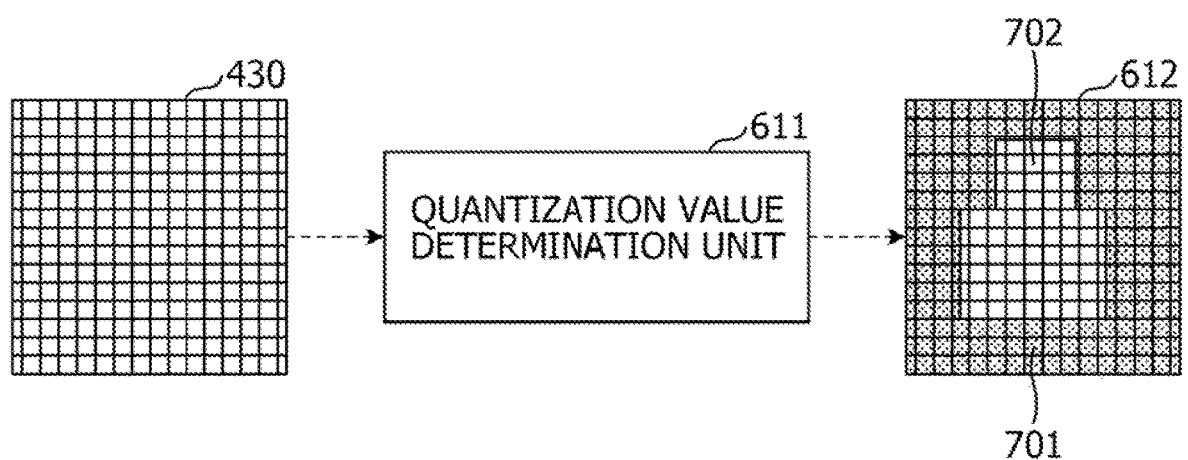
FIG. 7 is a first diagram illustrating a specific example of processing by the image compression device.

Next, a specific example of processing (here, the processing of the quantization value determination unit 611) of the image compression device 130 will be described. FIG. 7 is a first diagram illustrating a specific example of processing by the image compression device.

As illustrated in FIG. 7, when the map 430 (or the map 550) generated by the map generation unit 330 is transmitted, the quantization value determination unit 611 determines the quantization value 612 of each processing block on the basis of a value of an aggregation result of the each processing block.

The example of FIG. 7 illustrates a state in which different quantization values have been determined between each processing block included in a region 701 and each processing block included in a region 702. Note that, in the case of FIG. 7, the quantization value of each processing block included in the region 701 is set to be larger than the quantization value of each block included in the region 702.

As a result, among the image data 400, each processing block included in the region 701 undergoes the compression processing at a high compression level, and each processing block included in the region 702 undergoes the compression processing at a low compression level. That is, according to the image compression device 130, deterioration of the image quality can be reduced for the region important in the recognition processing (the region having a large degree of influence on the recognition result), and deterioration of the image quality can be increased for the region unimportant in the recognition processing (the region having a small degree of influence on the recognition result).

Flow of Data Size Reduction Processing by Image Processing System

Figure 8:
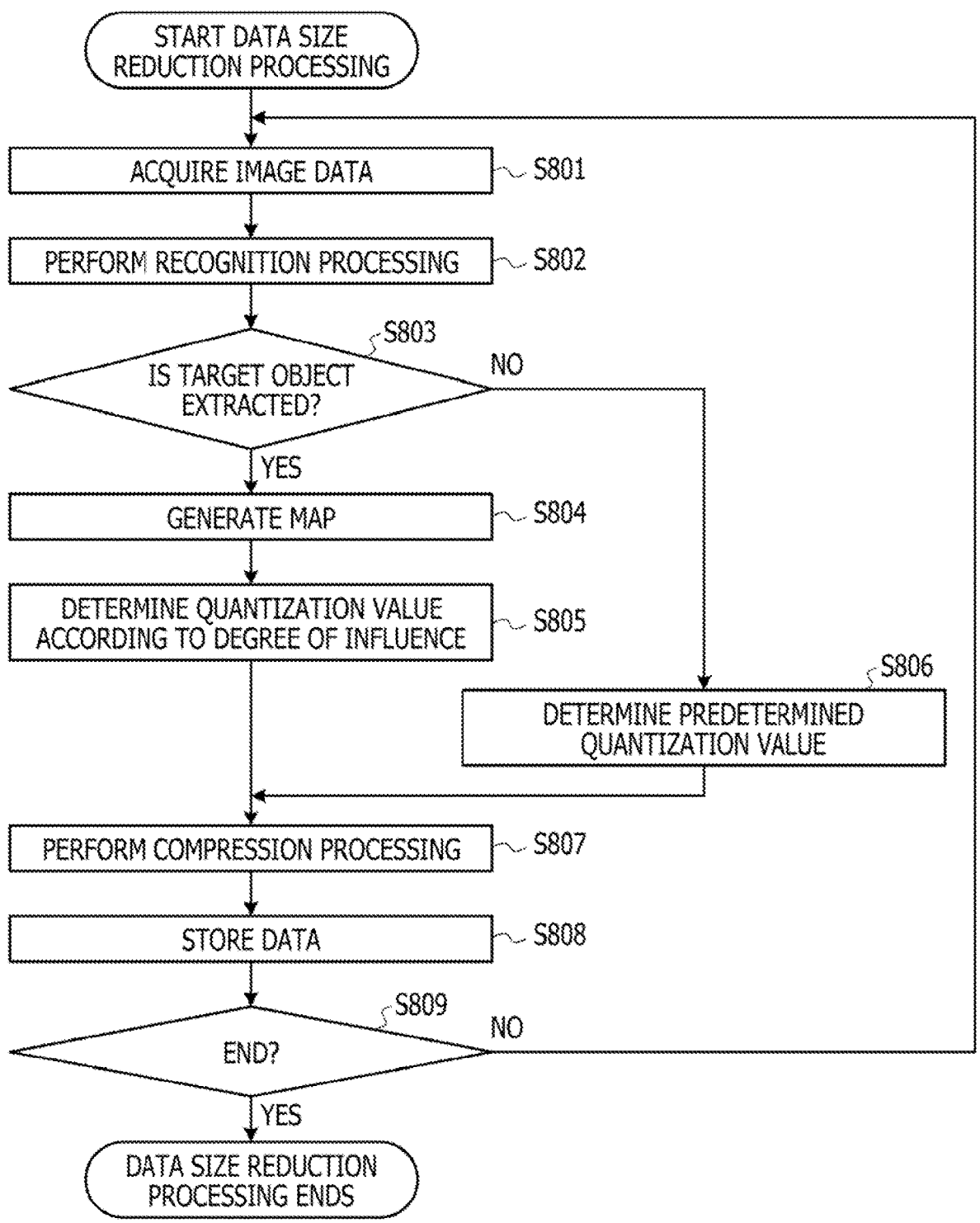
FIG. 8 is an example of a first flowchart illustrating a flow of data size reduction processing by the image processing system.

Next, a flow of data size reduction processing by the image processing system 100 will be described. FIG. 8 is an example of a first flowchart illustrating a flow of the data size reduction processing by the image processing system.

In step S801, the input unit 310 acquires image data in units of frames.

In step S802, the CNN unit 320 performs the recognition processing for the image data acquired in units of frames.

In step S803, the map generation unit 330 determines whether the target object has been extracted from the image data as a result of the recognition processing by the CNN unit 320. In the case where it is determined that the target object has been extracted in step S803 (Yes in step S803), the processing proceeds to step S804.

In step S804, the map generation unit 330 generates a map in which the degree of influence of each region of the image data on the recognition result is aggregated in units of processing blocks.

In step S805, the determination unit 610 determines the quantization value of each processing block on the basis of the generated map.

On the other hand, in the case where it is determined that the target object has not been extracted in step S803 (No in step S803), the processing proceeds to step S806.

In step S806, the determination unit 610 determines the quantization value of each processing block used when the compression processing is performed for the image data as a predetermined quantization value.

In step S807, the encoding unit 620 performs the compression processing using the determined quantization value of each processing block to generate compressed data.

In step S808, the encoding unit 620 stores the compressed data in the storage device 140.

In step S809, the input unit 310 determines whether there is the next image data. In step S810, it is determined to continue the data size reduction processing in the case where there is the next image data (determined to be No in step S809) and the processing returns to step S801.

On the other hand, in step S809, it is determined to terminate the data size reduction processing in the case where there is no next image data (determined to be Yes in step S809) and the data size reduction processing is terminated.

As is clear from the above description, the image processing system according to the first embodiment generates the map in which the degree of influence of each region of the image data on the recognition result is aggregated for each processing block when performing the recognition processing for the image data. Furthermore, the image processing system according to the first embodiment determines the quantization value on the basis of the generated map (the map indicating the degree of influence on the recognition result, which is aggregated for each processing block).

As a result, according to the image processing system of the first embodiment, the deterioration of the image quality can be reduced for the processing block important in the recognition processing, and the deterioration of the image quality can be increased for the processing block unimportant in the recognition processing.

As a result, according to the first embodiment, the data size reduction processing suitable for image recognition processing can be implemented.

Second Embodiment

In the above-described first embodiment, the description has been given on the premise that the quantization value determined on the basis of the map generated when the image data 400 undergoes the recognition processing is used for the compression processing for the image data 400. However, it may take some time to generate the map and determine the quantization value.

Therefore, in a second embodiment, a case where a quantization value determined on the basis of a map generated when image data 400 undergoes recognition processing is used for compression processing for image data acquired after the image data 400 will be described. Note that, hereinafter, differences from the first embodiment will be mainly described.

Functional Configuration of Image Compression Device

Figure 9:
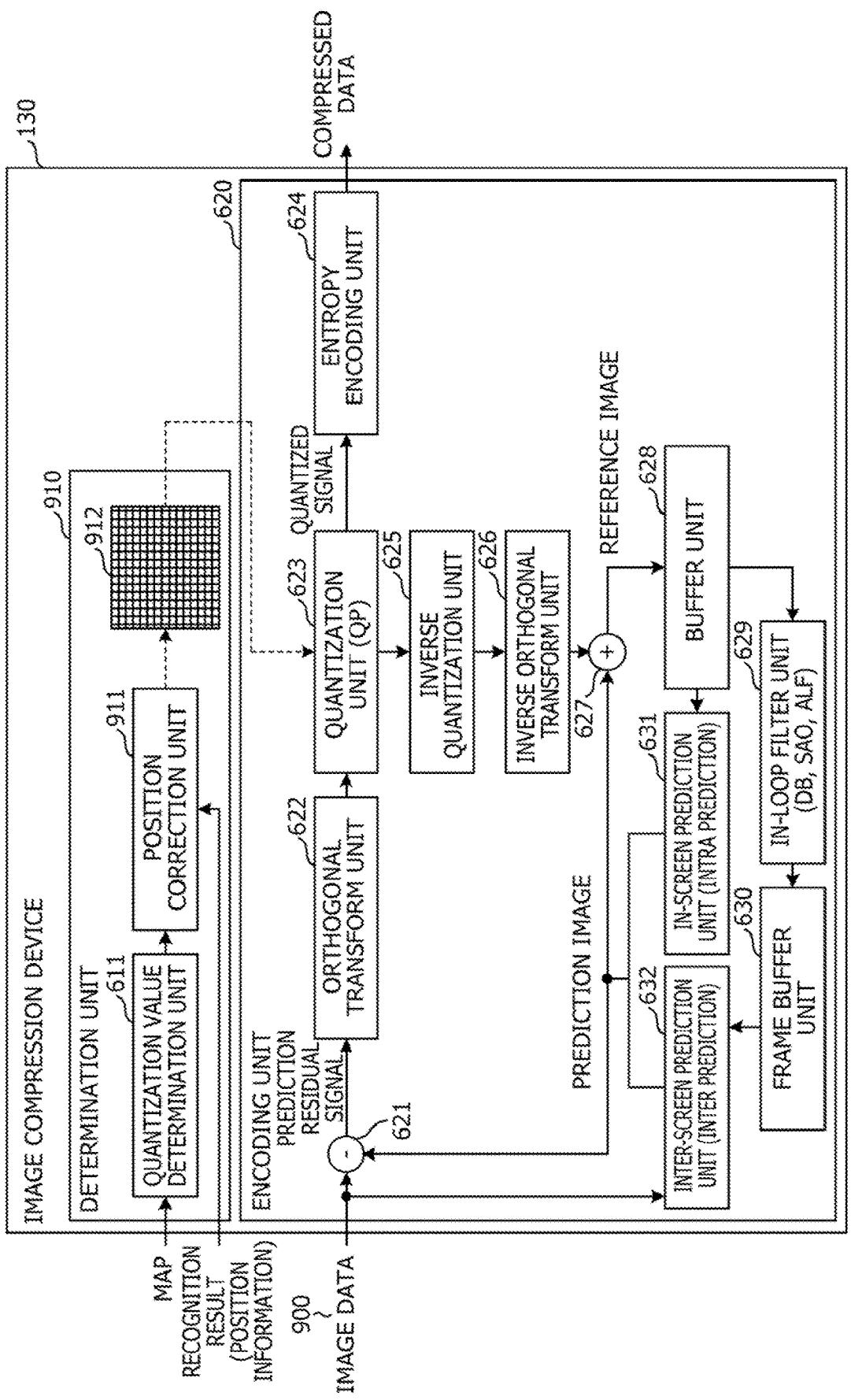
FIG. 9 is a second diagram illustrating an example of the functional configuration of the image compression device.

First, a functional configuration of an image compression device 130 according to the second embodiment will be described. FIG. 9 is a second diagram illustrating an example of a functional configuration of the image compression device. The difference from FIG. 6 is a functional configuration of a determination unit 910.

As illustrated in FIG. 9, the determination unit 910 includes a quantization value determination unit 611 and a position correction unit 911. Among them, the function of the quantization value determination unit 611 is the same as the function of the quantization value determination unit 611 in FIG. 6, and therefore description is omitted here.

Note that the map that the quantization value determination unit 611 acquires from the image recognition device 120 is assumed to be, for example, a map generated when a CNN unit 320 has performed recognition processing for the image data 400 (first image data) acquired by an input unit 310 at time t1.

For example, when performing compression processing for image data 900 (second image data), the position correction unit 911 acquires a recognition result of when the recognition processing has been performed for the image data 900 by the image recognition device 120. Note that the image data 900 is image data acquired by an encoding unit 620, which has been acquired by the input unit 310 at time t2 (time after time t1). Furthermore, the recognition result that the position correction unit 911 acquires is assumed to include position information of a target object.

Furthermore, the position correction unit 911 corrects the quantization value of each processing block determined by the quantization value determination unit 611 on the basis of the position information of the target object included in the image data 900, and notifies a corrected quantization value 912 to the encoding unit 620.

Specifically, the position correction unit 911 first calculates change amounts in position and size of the target object between time t1 and time t2 on the basis of the position information included in the recognition result when the image data 400 acquired by the input unit 310 at time t1 has undergone the recognition processing, and the position information included in the recognition result when the image data 900 acquired by the input unit 310 at time t2 has undergone the recognition processing.

Next, the position correction unit 911 corrects the quantization value of each processing block notified by the quantization value determination unit 611 on the basis of the calculated change amounts in position and size of the target object. For example, it is assumed that the quantization value of each processing block notified by the quantization value determination unit 611 is different quantization values between the processing block included in the target object and the processing block not included in the target object.

In this case, the position correction unit 911 applies the quantization value of the processing block included in the target object to the processing block specified according to the calculated change amounts in position and size of the target object. Furthermore, the position correction unit 911 applies the quantization value of the processing block not included in the target object as the quantization value of the processing block other than the processing block to which the quantization value of the processing block included in the target object is applied.

Specific Example of Processing of Image Compression Device

Figure 10:
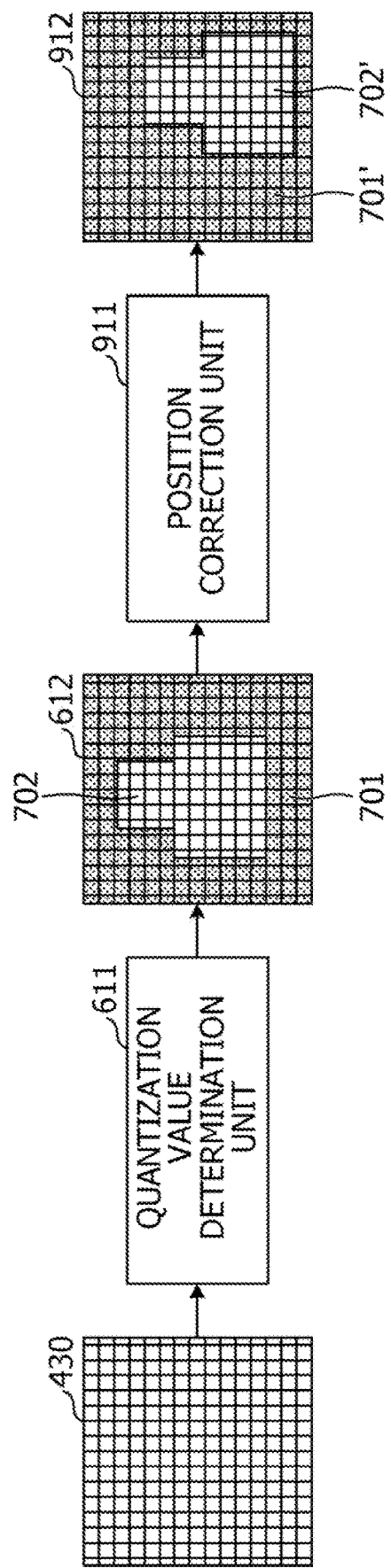
FIG. 10 is a diagram illustrating a second specific example of the processing by the image compression device.

Next, a specific example of processing of an image compression device 130 will be described. FIG. 10 is a second diagram illustrating a specific example of processing of the image compression device.

As illustrated in FIG. 10, when a map 430 for the image data 400 generated by a map generation unit 330 is transmitted, the quantization value determination unit 611 determines a quantization value 612 of each processing block on the basis of a value of an aggregation result of the each processing block of the map 430.

The example of FIG. 10 illustrates a case where different values are determined between the quantization value of each processing block contained in a region 701 other than the target object and the quantization value of each processing block included in a region 702 of the target object.

Here, the position correction unit 911 acquires the recognition result of when the image data 900 has undergone the recognition processing. Then, the position correction unit 911 calculates the change amounts in position and size of the target object from when the image data 400 has been acquired to when the image data 900 has been acquired by comparing the recognition result with the already acquired recognition result of when the image data 400 has undergone the recognition processing.

Moreover, the position correction unit 911 corrects the quantization value 612 of each processing block on the basis of the calculated change amount, and obtains a quantization value 912 of each processing block. The example of FIG. 10 illustrates a state in which the target object has moved to a lower right position from when the image data 400 has been acquired to when the image data 900 has been acquired (see the region 702 a region 702').

Therefore, the quantization value determined in the processing block included in the region 702 is applied to the processing block included in the region 702', and the quantization value determined in the processing block included in the region 701 is applied to the processing block included in the region 701'.

Flow of Image Compression Processing by Image Processing System

Figure 11:
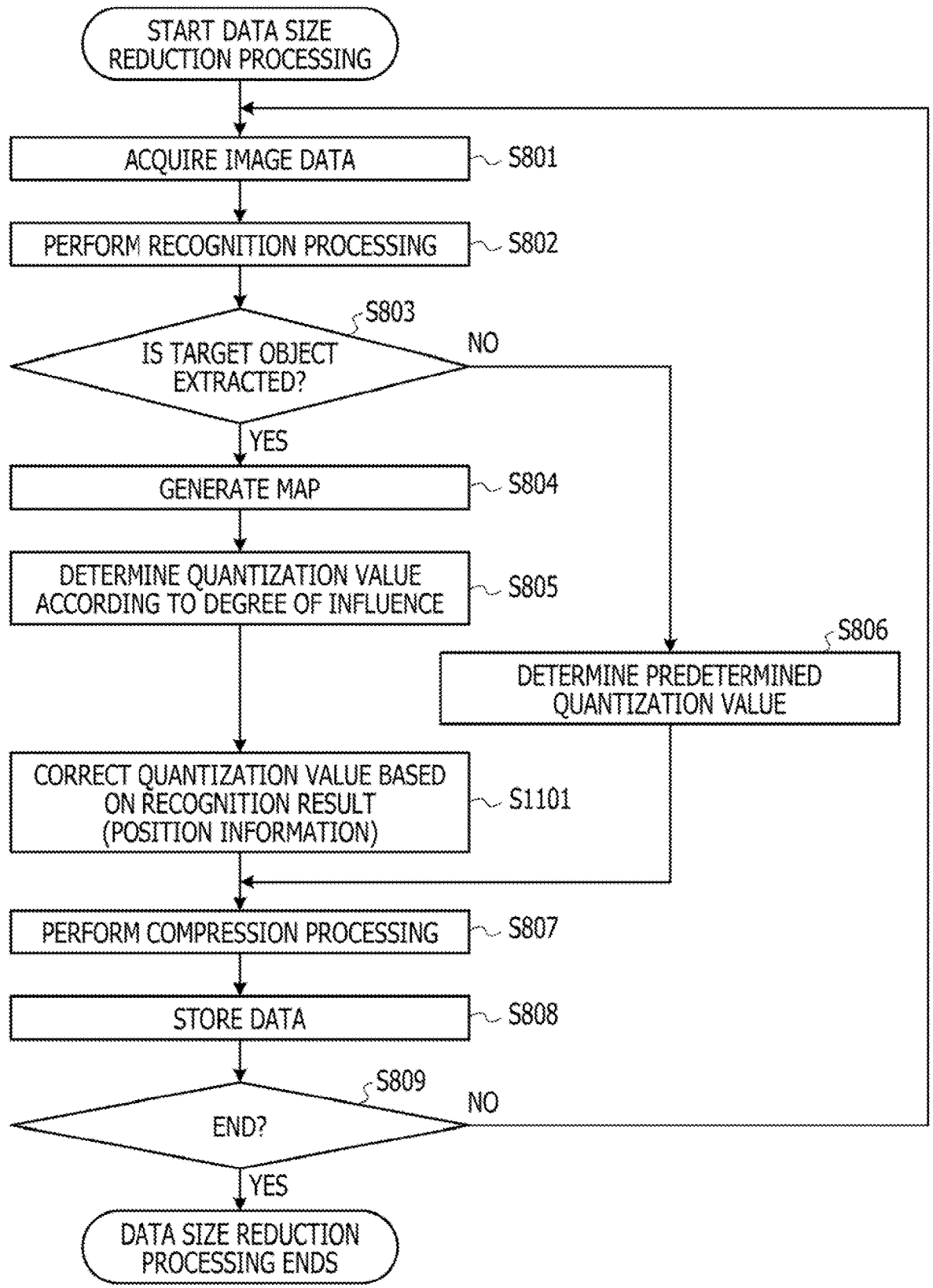
FIG. 11 is an example of a second flowchart illustrating the flow of the data size reduction processing by the image processing system.

Next, a flow of image compression processing by an image processing system 100 will be described. FIG. 11 is an example of a second flowchart illustrating the flow of the image compression processing by the image processing system. The difference from the first flowchart illustrated in FIG. 8 is step S1101.

In step S1101, the position correction unit 911 corrects the determined quantization value of each processing block on the basis of the change amounts in position and size of the target object.

As is clear from the above description, the image processing system according to the second embodiment generates the map in which the degree of influence of each region of the first image data on the recognition result is aggregated in units of processing blocks when performing the recognition processing for the image data. Furthermore, the image processing system according to the second embodiment determines the quantization value on the basis of the generated map (the map indicating the degree of influence on the recognition result, which is aggregated for each processing block). Furthermore, the image processing system according to the second embodiment corrects the determined quantization value on the basis of the change amounts in position and size of the target object from when the first image data has been acquired to when the second image data has been acquired. Moreover, the image processing system according to the second embodiment reduces data size of the second image data by performing the compression processing for the second image data using the corrected quantization value.

As a result, according to the image processing system of the second embodiment, the deterioration of the image quality can be reduced for the processing block important even in the case where the processing block important in the recognition processing is moved, and the deterioration of the image quality can be increased for the processing blocks other than the processing block.

As a result, according to the second embodiment, the data size reduction processing suitable for image recognition processing can be implemented.

Third Embodiment

In the above-described first and second embodiments, a case of reducing the data size by performing the compression processing, changing the compression levels between the important processing block and the unimportant processing block in the recognition processing has been described. In contrast, in a third embodiment, compressed data is efficiently stored by performing compression processing separately for a target object and background. Hereinafter, the third embodiment will be described below focusing on differences from the above-described first embodiment.

Figure 12:
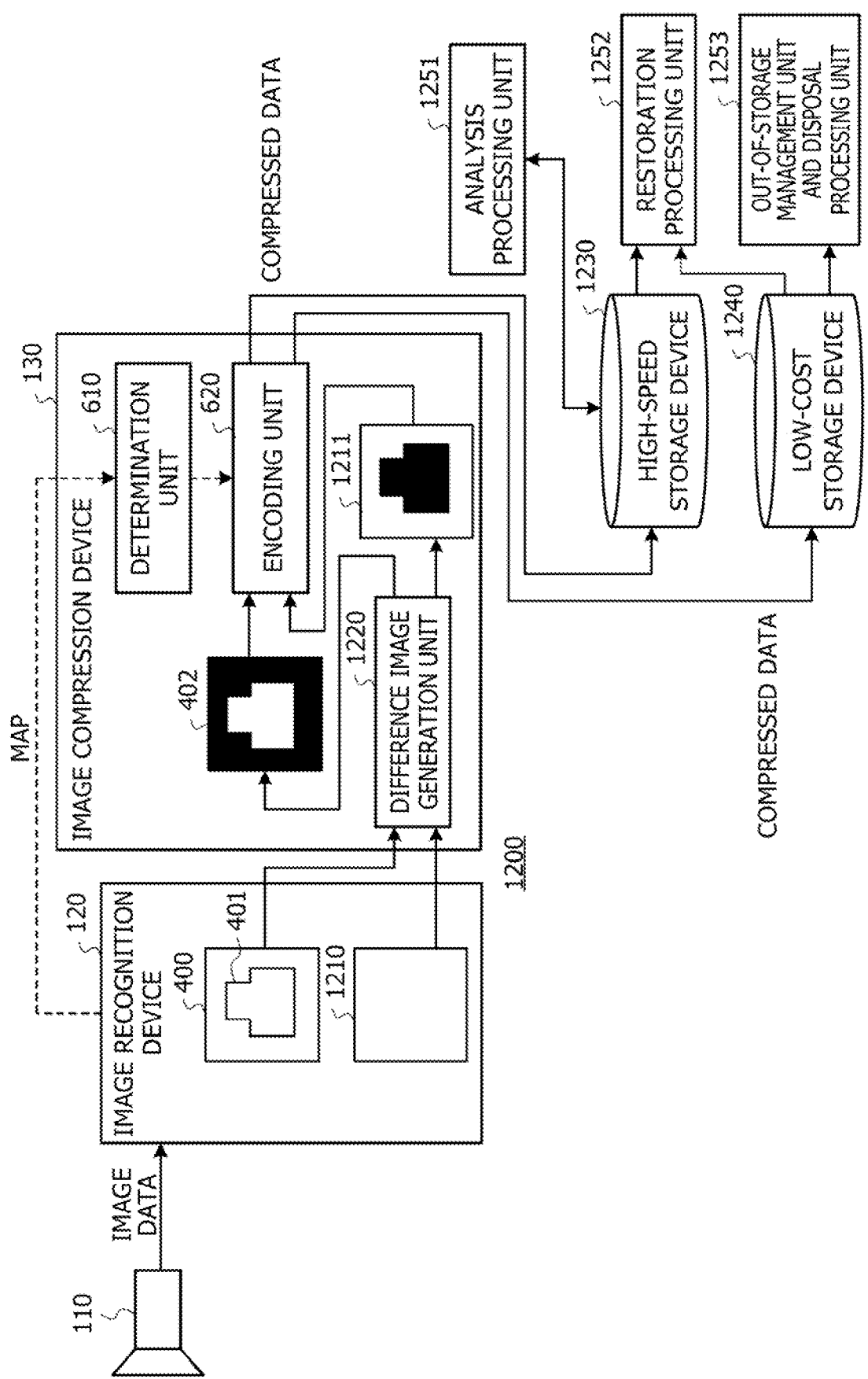
FIG. 12 is a second diagram illustrating an example of the system configuration of the image processing system.

Specific Example of System Configuration of Image Processing System and Method of Storing Compressed Data FIG. 12 is a second diagram illustrating an example of a system configuration of an image processing system. A specific example of a system configuration of an image processing system 1200 and a method of storing compressed data according to the third embodiment will be described with reference to FIG. 12.

The difference from the system configuration illustrated in FIG. 1 is that an image compression device 130 has a difference image generation unit 1220 in the case of FIG. 12. Furthermore, in the case of FIG. 12, a high-speed storage device 1230 (first storage device) and a low-cost storage device 1240 (second storage device) are included. Furthermore, in the case of FIG. 12, the high-speed storage device 1230 is connected to an analysis processing unit 1251 and a restoration processing unit 1252 of an information processing device (not illustrated). Moreover, in the case of FIG. 12, the low-cost storage device 1240 is connected to an out-of-storage management unit and disposal processing unit 1253 of the information processing device (not illustrated).

As illustrated in FIG. 12, an image recognition device 120 performs recognition processing for image data 400 including a target object 401, and transmits a recognition result together with the image data 400 to the image compression device 130.

Furthermore, the image recognition device 120 performs the recognition processing for image data 1210 that is image data acquired before or after the acquisition of the image data 400 and does not include the target object, and transmits a recognition result together with the image data to the image compression device 130.

The image compression device 130 has the difference image generation unit 1220, calculates a difference between the image data 400 including the target object and the image data 1210 not including the target object, and inputs difference image data 402 (image data of the target object) to an encoding unit 620.

Note that the difference image data 402 is first difference image data in which a region other than a region of the target object is a zero value in the image data 400 including the target object.

Furthermore, the difference image generation unit 1220 calculates a difference between the image data 400 including the target object and the difference image data 402 (image data of the target object), and generates difference image data 1211 (background image data). Note that the difference image data 1211 is second difference image data in which a region corresponding to the region of the target object is a zero value in the image data 1210 that does not include the target object. Moreover, the difference image generation unit 1220 inputs the generated difference image data 1211 to the encoding unit 620.

The encoding unit 620 performs compression processing for the difference image data 402 using a quantization value determined by a determination unit 610 on the basis of a map generated when the image data 400 has undergone recognition processing, and stores compressed data (first compressed data) in the high-speed storage device 1230.

Furthermore, the encoding unit 620 performs the compression processing for the difference image data 1211 using a predetermined quantization value (quantization value for high compression), and stores compressed data (second compressed data) in the low-cost storage device 1240.

As a result, the compressed data of the target object is stored in the high-speed storage device 1230. The compressed data of the target object is compressed data with less deterioration in image quality for a processing block important in the recognition processing, and more deterioration in image quality for a processing block unimportant in the recognition processing, of the target object.

Furthermore, the background compressed data is stored in the low-cost storage device 1240. The background compressed data is compressed data obtained by performing high compression processing for background image data.

As a result, the analysis processing unit 1251 can analyze the image data of the target object with less deterioration in image quality for the processing block important in the recognition processing by reading the compressed data from the high-speed storage device 1230.

Furthermore, the restoration processing unit 1252 can restore image data of a combination of
- the image data of the target object with less deterioration in the image quality for the processing block important in the recognition processing, and
- the background image data with more deterioration in the image quality by reading the compressed data from the high-speed storage device 1230 and the low-cost storage device 1240. That is, in a case where a user wants to confirm the entire image data including the target object and the background, the entire image data can be provided to the user.

Moreover, the out-of-storage management unit and disposal processing unit 1253 can perform out-of-storage management processing or disposal processing for the background compressed data by reading the compressed data from the low-cost storage device 1240.

As is clear from the above description, in the image processing system 1200 according to the third embodiment, the target object and the background separately undergo the compression processing. Thereby, according to the image processing system of the third embodiment, the compressed data can be efficiently stored.

Fourth Embodiment

In the above-described first to third embodiments, the description has been given on the assumption that the image data transmitted from the imaging device 110 and the image data that the image recognition device 120 performs the recognition processing are the same in data size.

However, the image size of the image data transmitted from the imaging device 110 may exceed the image size that the image recognition device 120 can perform the recognition processing. In such a case, the image data transmitted from the imaging device 110 undergoes reduction processing or cutout processing and is then input to the image recognition device 120.

In a fourth embodiment, an image processing system capable of visually recognizing image data of original image size when restoring compressed data that is stored in a storage device in this way will be described.

System Configuration of Image Processing System

Figure 13:
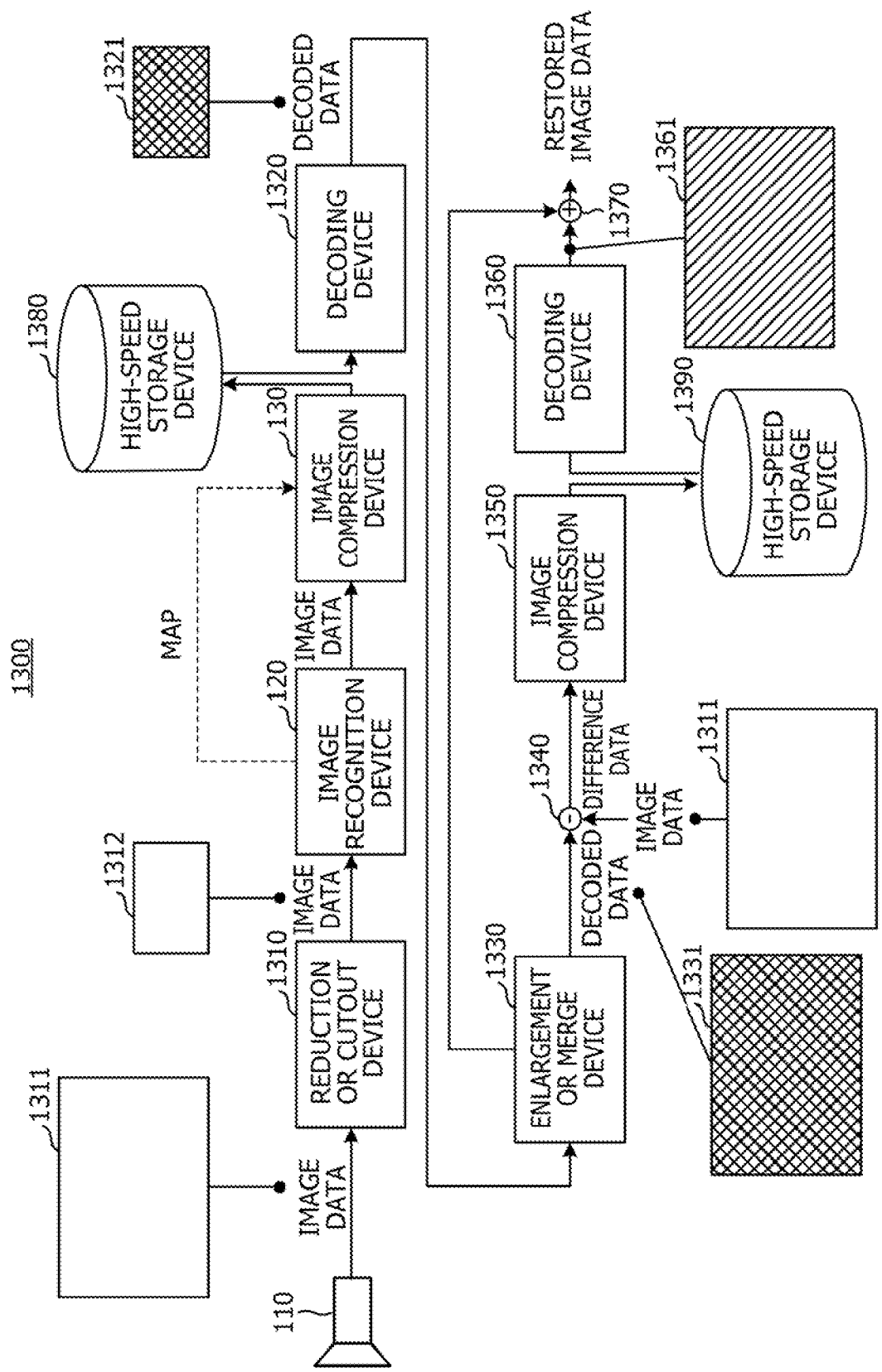
FIG. 13 is a third diagram illustrating an example of the system configuration of the image processing system.

FIG. 13 is a third diagram illustrating an example of a system configuration of an image processing system. A system configuration of an image processing system 1300 according to the fourth embodiment will be described with reference to FIG. 13.

As illustrated in FIG. 13, the image processing system 1300 includes an imaging device 110, a reduction or cutout device 1310, an image recognition device 120, an image compression device 130, a decoding device 1320, and an enlargement or merge device 1330. Moreover, the image processing system 1300 includes a difference device 1340, an image compression device 1350, a decoding device 1360, and an addition device 1370.

Under such a system configuration, when image data 1311 is transmitted by the imaging device 110, the reduction or cutout device 1310 performs reduction processing or cutout processing for the image data 1311 so that the image size becomes image size that can undergo recognition processing in the image recognition device 120.

The reduction or cutout device 1310 transmits image data 1312 generated by performing the reduction processing or the cutout processing to the image recognition device 120. Note that, as illustrated in FIG. 13, the image size of the image data 1312 is assumed to be smaller than the image size of the image data 1311.

The image recognition device 120 performs the recognition processing for the image data 1312 transmitted from the reduction or cutout device 1310, and generates a map in which the degree of influence on a recognition result is aggregated for each processing block. Furthermore, the image recognition device 120 transmits the image data and the map to the image compression device 130.

The image compression device 130 performs compression processing for the image data transmitted from the image recognition device 120 using a quantization value corresponding to the map, and stores compressed data in a high-speed storage device 1380.

The decoding device 1320 reads the compressed data from the high-speed storage device 1380 and decodes the compressed data to generate decoded data 1321. The decoding device 1320 transmits the generated decoded data 1321 to the enlargement or merge device 1330.

The enlargement or merge device 1330 generates decoded data 1331 by performing enlargement processing or merge processing for the decoded data 1321 transmitted from the decoding device 1320.

The difference device 1340 calculates a difference between the decoded data 1331 and the image data 1311 and generates difference data. Furthermore, the difference device 1340 transmits the generated difference data to the image compression device 1350.

The image compression device 1350 performs compression processing for the difference data transmitted from the difference device 1340, and stores the compressed data in a high-speed storage device 1390.

In this way, the image processing system 1300 stores the image data 1311 as
- the compressed data generated by the image compression device 130, and
- the compressed data generated by the image compression device 1350, in the high-speed storage device 1380 and the high-speed storage device 1390.

Here, the image processing system 1300 restores the image data 1311 by the following procedure on the basis of the compressed data generated by the image compression device 130 and the compressed data generated by the image compression device 1350.

First, the decoding device 1320 reads the compressed data from the high-speed storage device 1380 and decodes the compressed data to generate the decoded data 1321. Next, the enlargement or merge device 1330 generates decoded data 1331 by performing the enlargement processing or the merge processing for the decoded data 1321 and transmits the decoded data to the addition device 1370.

Meanwhile, the decoding device 1360 reads the compressed data from the high-speed storage device 1390 and decodes the compressed data to generate decoded data 1361. Furthermore, the decoding device 1360 transmits the generated decoded data 1361 to the addition device 1370.

The addition device 1370 restores the image data 1311 by adding the decoded data 1331 transmitted from the enlargement or merge device 1330 and the decoded data 1361 transmitted from the decoding device 1360.

As described above, according to the image processing system 1300, the image data of the original image size can be restored even in a case where the image data transmitted from the imaging device 110 is reduced or cut out and undergoes compression processing.

Fifth Embodiment

In the above-described first to fourth embodiments, the description has been given on the premise that the image compression device 130 performs the compression processing with the quantization value corresponding to the map generated by the image recognition device 120. However, there are some cases where the quantization value may not be changed depending on the image compression device 130.

In a fifth embodiment, even in such a case, data size reduction processing suitable for image recognition processing is implemented by performing processing treatment according to the degree of influence on a recognition result. Hereinafter, the fifth embodiment will be described below focusing on differences from the above-described first embodiment.

System Configuration of Image Processing System

Figure 14:
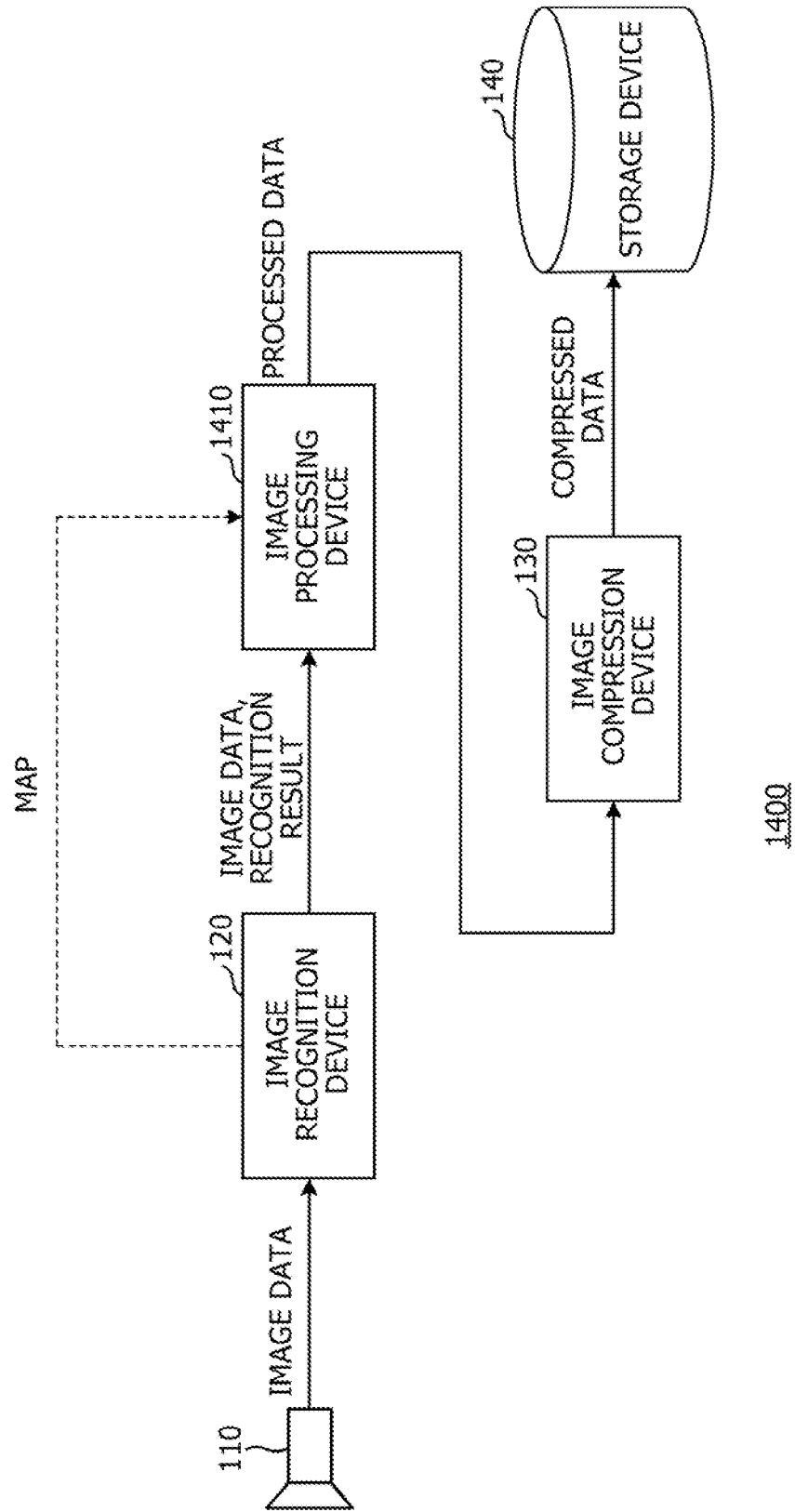
FIG. 14 is a fourth diagram illustrating an example of the system configuration of the image processing system.

FIG. 14 is a fourth diagram illustrating an example of a system configuration of an image processing system. A system configuration of an image processing system 1400 according to the fifth embodiment will be described with reference to FIG. 14.

As illustrated in FIG. 14, the image processing system 1400 includes an imaging device 110, an image recognition device 120, an image processing device 1410, and an image compression device 130.

When image data is transmitted by the imaging device 110, the image recognition device 120 performs recognition processing for the image data and generates a map in which the degree of influence on a recognition result is aggregated for each processing block. Furthermore, the image recognition device 120 transmits the image data and the map to the image processing device 1410.

The image processing device 1410 is a device that functions as an execution unit, and processes the image data into data (processed data) for which data size reduction processing can be implemented by compression processing of the image compression device 130.

Specifically, the image processing device 1410 performs, as processing for reducing the data size of the image data, processing treatment such as:

invalidation of a processing block with a low aggregation result value in the map, among processing blocks of the image data, removal of a high frequency component for a processing block with a low aggregation result value in the map, among the processing blocks of the image data, and removal of a color component for the processing block with a low aggregation result value in the map, among the processing blocks of the image data. Note that these pieces of processing treatment performed in the image processing device 1410 are examples, and one of the processing treatment may be performed or another processing treatment may be performed (processing treatment method is arbitrary). Furthermore, it is assumed that a relationship between the aggregation result value of each processing block in the map and the processing treatment method is predetermined.

The image processing device 1410 transmits the processed data generated by performing the processing treatment for the image data to the image compression device 130.

The image compression device 130 performs the compression processing for the processed data transmitted from the image processing device 1410, using a predetermined quantization value, to generate compressed data. Furthermore, the image compression device 130 stores the generated compressed data in the storage device 140.

As described above, according to the image processing system 1400, the image compression device 130 can generate compressed data according to the degree of influence on the recognition result even in the case where the quantization value is not able to be changed during the compression processing.

Other Embodiments

In the above-described second embodiment, the description has been given on the premise that the change amounts in position and size of the target object are calculated on the basis of the position information included in the recognition result. However, the method for calculating the change amounts in position and size of the target object is not limited to this, and the change amounts in position and size of the target object may be calculated using an arbitrary tracking algorithm.

Furthermore, in the above-described fifth embodiment, the description has been given on the premise that the image processing device 1410 is provided in the case where the image compression device 130 is not able to change the quantization value during the compression processing. However, even if the image compression device 130 can change the quantization value during the compression processing, the image processing device 1410 may be provided and the processing treatment may be performed.

Furthermore, in each of the above-described embodiments, the description has been given on the premise that the CNN unit 320 determines the presence or absence of the target object by performing the recognition processing. However, the method for determining the presence or absence of the target object is not limited to this, and the presence or absence of the target object may be determined by providing an extraction unit or the like in front of the CNN unit 320, and the extraction unit or the like performing processing of extracting the target object from the image data.

Furthermore, in each of the above-described embodiments, the description has been given on the premise that the image data not including the target object undergoes the compression processing and is stored in the storage device. However, the image data not including the target object may not be stored in the storage device.

Furthermore, in each of the above-described embodiments, the description has been given on the premise that the image recognition device 120 and the image compression device 130 are separate devices. However, the image recognition device 120 and the image compression device 130 may be an integrated device. In this case, the integrated device functions as the input unit 310 to the output unit 340 and the determination unit 610 to the encoding unit 620 when an image processing program (image recognition program +image compression program) installed in the integrated device is executed.

Note that the present invention is not limited to the configurations described here, and may include combinations of the configurations or the like described in the above embodiments with other elements, and the like. These points can be changed without departing from the spirit of the present invention, and can be appropriately determined according to application modes of the points.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An image processing system comprising:
   one or more memories; and
   one or more processors coupled to the one or more memories and the one or more processors configured to:
   acquire a degree of influence of each region of image data on a recognition result when recognition processing is performed for the image data;
   reduce data size of the image data based on the degree of influence, the degree of influence of each region on the recognition result is aggregated for each processing block of when compression processing is performed for the image data;
   determine a quantization value of each processing block of when the compression processing is performed for the image data according to a value of an aggregation result of each processing block; and
   correct the determined quantization value of the each processing block based on change amounts in position and size of a target object between first image data used when calculating the degree of influence of each region on the recognition result and second image data for which the compression processing is performed applying the determined quantization value of the each processing block.

2. The image processing system according to claim 1, wherein the one or more processors are further configured to acquire the degree of influence of each region of the image data on the recognition result by using one selected from a BP method, a GBP method, and a selective BP method.

3. The image processing system according to claim 1, wherein the one or more processors are further configured to:
   generate first compressed data by performing compression processing for first difference image data that is a difference between image data that includes a target object and image data that does not include the target object at a compression level according to the degree of influence of each region of the image data that includes the target object on the recognition result, and
   generate second compressed data by performing compression processing for second difference image data that is a difference between the image data that includes target object and the first difference image data at a certain compression level.

4. The image processing system according to claim 1, wherein the one or more processors are further configured to determine a method of processing treatment for each processing block of reducing the data size of the image data according to a value of an aggregation result of each processing block.

5. An image processing method for a computer to execute a process comprising:
   acquiring a degree of influence of each region of image data on a recognition result when recognition processing is performed for the image data;
   reducing data size of the image data based on the degree of influence, the degree of influence of each region on the recognition result is aggregated for each processing block of when compression processing is performed for the image data;
   determining a quantization value of each processing block of when the compression processing is performed for the image data according to a value of an aggregation result of each processing block; and
   correcting the determined quantization value of the each processing block based on change amounts in position and size of a target object between first image data used when calculating the degree of influence of each region on the recognition result and second image data for which the compression processing is performed applying the determined quantization value of the each processing block.

6. A non-transitory computer-readable storage medium storing an image processing program that causes at least one computer to execute a process, the process comprising:
   acquiring a degree of influence of each region of image data on a recognition result when recognition processing is performed for the image data;
   reducing data size of the image data based on the degree of influence, the degree of influence of each region on the recognition result is aggregated for each processing block of when compression processing is performed for the image data;
   determining a quantization value of each processing block of when the compression processing is performed for the image data according to a value of an aggregation result of each processing block; and
   correcting the determined quantization value of the each processing block based on change amounts in position and size of a target object between first image data used when calculating the degree of influence of each region on the recognition result and second image data for which the compression processing is performed applying the determined quantization value of the each processing block.

\* \* \* \* \*